G. W. COOK.
Churn.
No. 3,460.   Patented Feb. 28, 1844.
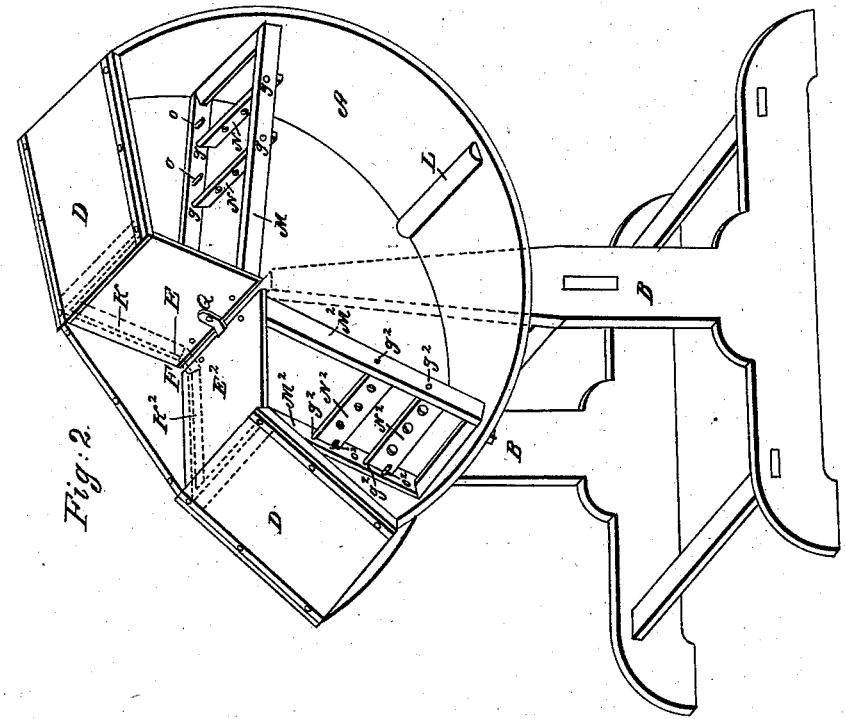

UNITED STATES PATENT OFFICE.

GEO. W. COOK, OF SCHENECTADY, NEW YORK.

CHURN.

Specification of Letters Patent No. 3,460, dated February 28, 1844.

*To all whom it may concern:*

Be it known that I, GEORGE W. COOK, of Schenectady, in the county of Schenectady and State of New York, have invented a new and Improved Churn for Producing Butter, which is called "Cook's Ventilating Churn," described as follows, reference being had to the annexed drawings of the same, making part of this specification.

Figure 1 is a perspective view of the exterior of the machine. Fig. 2 is a perspective view of the interior of the machine, a side of the machine being taken off in order to obtain a view of the interior.

The vessel A for containing the cream and in which the butter is produced is a semi-cylinder suspended in a suitable frame B by means of horizontal pivots projecting from the faces of vertical plates C fastened to the sides of the vessel in such manner that the vessel will be nicely balanced so that very little power will be required to rock the vessel to and fro. The convex part of the cylinder forms the bottom and hangs low in the frame. The chord of the arc of the semi-cylinder forms the top thereof and is closed by thin boards D secured to the ends of the vessel at an angle of about ten or fifteen degrees except a space in the middle which is left open for the introduction of the paddles and the cream and for air for ventilation. When the paddles are inserted the space is also nearly closed by thin inclined boards E fastened to the arms of the paddles or to the sides of the frame containing the paddles leaving a narrow space F, however, in the middle for the introduction of the cream and a current of fresh air to hasten the production of the butter and to improve its quality.

An aperture G is made in the vessel for drawing off the milk; which aperture is closed by a plug during the operation of churning. A block or stop H is fastened to the convex surface of the vessel on either side in a position to come in contact with a cross bar $B^2$ of the frame to prevent the vessel being canted too far. Handles I are inserted into the side of the vessel for the operator to lay hold of to rock the vessel. Straps of iron J are made to surround the vessel on the outside for strengthening it. Inclined strips K or ledges are fastened to the insides of the ends of the vessel for sustaining or supporting the inclined boards E of the dasher frame. A strip or cleat L is nailed across the middle of the bottom of the vessel on the inside at the center joint for strengthening the vessel. The ends of the vessel are let into grooves in the bottom and top thereof.

The frame M containing the turning paddles N is made of a rectangular form. The inclined board E aforesaid is fastened to the top thereof. The paddles N are rectangular boards perforated having gudgeons $g$ projecting from their upper corners which enter corresponding apertures in the sides of the frame M on which gudgeons the paddles swing or turn as the vessel is rocked. The frame M containing the vibrating paddles thus constructed is placed in the vessel at an angle of about 45 degrees with a vertical line, inclining from the center toward the concave part of the vessel being held in this position by having the board on the upper side of the frame to rest on the inclined ledges aforesaid nailed on the inside of the vessel. There is another frame $M^2$ and set of turning paddles made exactly like those just described, but inclined in an opposite direction and occupying the other half of the interior of the vessel. The inclined board $E^2$ of this frame rests upon inclined cleats $K^2$ secured to the ends of the vessel causing the frame to stand also at an angle of about 45 degs. with a vertical line; but as just stated inclines in an opposite direction as shown in the drawings Fig. 2.

When the vessel is canted, as represented in Fig. 2 the paddles N drop down or turn on their gudgeons assuming a position nearly at right angles to the sides of the frame of the paddles. At the same time the paddles $N^2$ of the other frame turn until they are in a line parallel with the sides of the frame when they strike against pins or stops $O^2$ inserted into the sides of the frame on the inside thereof. The position of the vessel being reversed the paddles of the two frames will likewise be reversed those of the frame $M^2$ now turning at right angles to the sides of the frame while the paddles of frame M become parallel, or in a straight line with the sides of the frame and with each other.

The frames of the paddles are held firmly in the positions in which they are placed by a button Q attached to one of the inclined boards and turned against the edge of the other inclined board of the other frame. As the vessel is rocked and one set of paddles is raised they turn and present their edges to the cream which passes between them while the other set of paddles strike against the stops so as to bring their flat surfaces in contact with the cream which passes through the perforations in the paddles and so on vice versa until the butter be produced. The paddles are then removed from the vessel and the butter discharged. The milk is let off through the aperture in the vessel.

The boxes in the heads of the sides of the churn frame in which the gudgeons or pivots of the vessel turn are cast dovetailed and inserted into openings of corresponding shape.

What I claim as my invention and which I desire to secure by Letters Patent is—

Combining with a rocking churn floats or paddles arranged in and hinged to a frame in the manner described all constructed as herein set forth.

GEO. W. COOK.

Witnesses:
 CHARLES D. PRIDDY,
 R. F. FRY.